United States Patent [19]

Tanaka et al.

[11] Patent Number: 4,547,081
[45] Date of Patent: Oct. 15, 1985

[54] DYNAMIC PRESSURE TYPE FLUID BEARING

[75] Inventors: Katsuhiko Tanaka, Yamoto; Ikunori Sakatani, Fujisawa, both of Japan

[73] Assignee: Nippon Seiko Kabushiki Kaisha, Tokyo, Japan

[21] Appl. No.: 611,385

[22] Filed: May 17, 1984

Related U.S. Application Data

[63] Continuation of Ser. No. 406,868, Aug. 10, 1982, abandoned.

[30] Foreign Application Priority Data

Aug. 26, 1981 [JP] Japan ................. 56-132814

[51] Int. Cl.$^4$ .............................................. F16C 17/10
[52] U.S. Cl. .................... 384/107; 384/108; 384/113; 384/121
[58] Field of Search .......... 384/99, 100, 107, 108–110, 384/112, 114, 115, 118, 121, 123, 397, 398

[56] References Cited

FOREIGN PATENT DOCUMENTS 13049 2/1977 Japan ................................. 384/123

Primary Examiner—Stuart S. Levy
Assistant Examiner—David Werner
Attorney, Agent, or Firm—Wyatt, Gerber, Shoup

[57] ABSTRACT

A dynamic pressure type fluid bearing comprises a housing provided with a cylindrical hole having a cylindrically shaped inner bearing surface for radial load and a bottom bearing surface for thrust load, and a shaft disposed in the cylindrical hole and having a cylindrically shaped outer bearing surface for radial load opposed to and cooperative with the inner bearing surface and an end bearing surface for thrust load opposed to and cooperative with the bottom bearing surface. At least one of the inner bearing surface and the outer bearing surface is provided with grooves for generating a dynamic pressure. A communication hole is provided in the bottom bearing surface and opens to the outside of the housing. The bottom bearing surface has around the communication hole an annular contact bearing surface which contacts the end bearing surface when the bearing is stationary.

6 Claims, 4 Drawing Figures

DYNAMIC PRESSURE TYPE FLUID BEARING

This application is a continuation of copending application Ser. No. 406,868 filed Aug. 10, 1982 and now abandoned.

BACKGROUND OF THE INVENTION

1. Field of the Invention

This invention relates to a dynamic pressure type fluid bearing which maintains the thrust load capability during rotation constant.

2. Description of the Prior Art

In the dynamic pressure type fluid bearing according to the prior art, as shown in FIG. 1 of the accompanying drawings, a cylindrical hole 2 provided in a housing 1 has a cylindrically shaped inner bearing surface 3 for radial load and a bearing surface 4 for thrust load, and a shaft 5 disposed in the cylindrical hole 2 has a cylindrically shaped outer bearing surface 7 for radial load having grooves 6 for generating a dynamic fluid pressure and a convex conical end bearing surface 8 for thrust load. The housing 1 is provided with a communication hole 12 which communicates the inner bearing surface 3 with the upper surface of the housing 1.

Accordingly, when the shaft 5 rotates the grooves 6 force lubricating fluid surrounding the shaft downwardly and the shaft floats upwardly. The communication hole 12 thus opens to a pressure chamber 11, so that the lubricant in the pressure chamber 11 flows out to the upper surface of the housing 1 through the communication hole 12. In this way, the pressure applied to float the shaft 5 can be kept substantially constant.

However, it is technically difficult to accurately provide the communication hole 12 near the boundary 13 between the outer bearing surface and the end bearing surface, and it is therefore difficult to minimize the upward floating movement of the shaft 5. Also, the communication hole 12 is bent and runs deep into the housing 6. Consequently, there exists a high cost for machining the hole 12 and its passages. Further, during stoppage of rotation of the shaft 5, the end bearing surface 8 makes point-contact with the bottom bearing surface 4 and this leads to a great maximum contact surface pressure which in turn may lead to the possibility of an indentation being created in the bottom bearing surface 4.

SUMMARY OF THE INVENTION

It is an object of the present invention to eliminate the above-noted disadvantages peculiar to the prior art.

The invention will become fully apparent from the following detailed description of some embodiments thereof taken in conjunction with the accompanying drawings.

DESCRIPTION OF THE PREFERRED EMBODIMENTS

Figure 1:
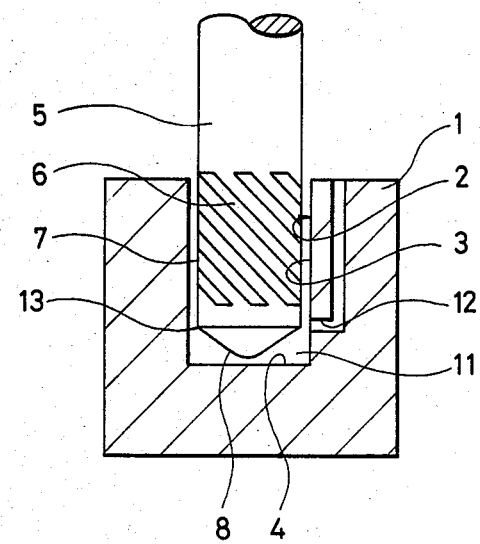
FIG. 1 is a cross-sectional view of the dynamic pressure type fluid bearing according to the prior art.
Figure 2:
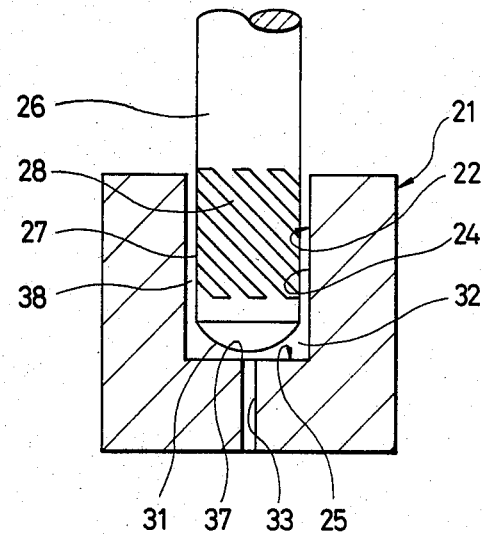
FIG. 2 is a cross-sectional view of a dynamic pressure type fluid bearing according to an embodiment of the present invention.

Referring to FIG. 2, a housing 21 comprises a single member and is formed with a cylindrical hole 22. The inner peripheral surface of the cylindrical hole 22 is provided with a cylindrically shaped inner bearing surface 24 for radial load and the bottom of the cylindrical hole 22 is provided with a planar bottom bearing surface 25 for thrust load. A shaft 26 is disposed in the cylindrical hole 22, and the outer peripheral surface of the shaft 26 is provided with a cylindrically shaped outer bearing surface 27 for radial load opposed to and cooperative with the inner bearing surface 24. The outer bearing surface 27 is provided with spiral grooves 28 for generating a dynamic fluid pressure, and one end surface of the shaft 26 is provided with a convexly spherical end bearing surface 31 for thrust load opposed to and cooperative with the bottom bearing surface 25. An axially extending communication hole 33 is formed centrally of the bottom bearing surface 25 and opens to the outside of the housing 21. The bottom bearing surface 25 has around the communication hole 33 an annular contact bearing surface 37 which contacts the end bearing surface 31 when the dynamic pressure type fluid bearing is stationary.

In the dynamic pressure type fluid bearing of the above-described construction, when the shaft 26 is stationary and when the shaft 26 is rotating at a low speed, the end bearing surface 31 is in contact with the bottom bearing surface 25, but when the shaft 26 rotates, the air in the radial bearing gap 38 between the inner bearing surface 24 and the outer bearing surface 27 flows into the pressure chamber 32 between the end bearing surface 31 and the bottom bearing surface 25 due to the pumping action of the dynamic pressure generating groove 28, and the shaft 26 floats upwardly. When the shaft 26 floats upwardly, the communication hole 33 opens to the pressure chamber 32 and the air in the pressure chamber flows out to the outside of the housing 21 through the communication hole 33. In this case, the pressure of the air in the pressure chamber 32 is adjusted to a substantially constant level by the change in amount of floatage of the shaft 26, and the shaft 26 rotates while being out of contact with the housing 21, and thus a predetermined thrust load capability can be obtained and the amount of floatage of the shaft 26 can be minimized.

Figure 3:
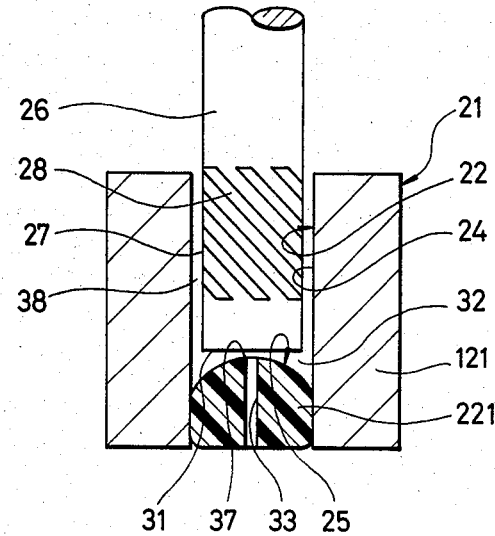
FIGS. 3 and 4 are cross-sectional views of dynamic pressure type fluid bearings according to further embodiments of the present invention.

FIG. 3 shows another embodiment of the present invention, in which a housing 21 comprises a sleeve 121 and a cylindrical roller surface 221 of synthetic resin fixedly fitted in the bottom of the inner peripheral surface of the sleeve 121 as by press fitting. The inner peripheral surface of the sleeve 121 provides an inner bearing surface 24 for radial load and the cylindrical roller surface 221 provides a convexly spherical bottom bearing surface 25 for thrust load. An axially extending communication hole 33 is formed in the bottom bearing surface 25, which is also provided with an annular contact bearing surface 37. A shaft 26 is provided with a planar end bearing surface 31 for thrust load.

If such bottom bearing surface 25 is formed of synthetic resin having a self-lubricating property, the abrasion of the bottom bearing surface 25 and the end bearing surface 31 will be small and the starting torque of the bearing will be low.

Figure 4:
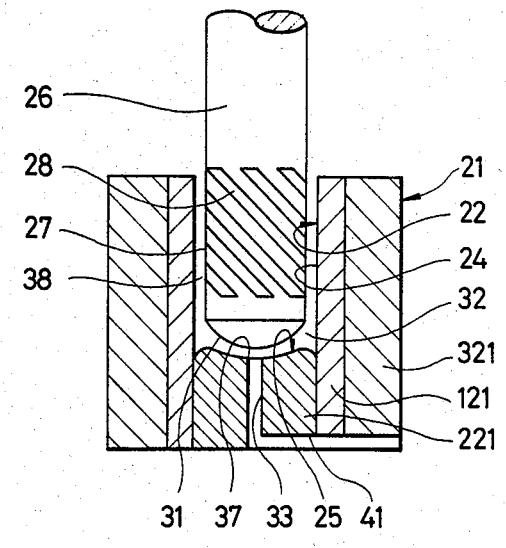

FIG. 4 shows another embodiment of the present invention in which a housing 21 comprises an outer cylinder 321, a sleeve 121 fixedly fitted inside the inner peripheral surface of the outer cylinder 321, and a cylindrical roller surface 221 fixedly fitted in the bottom of the inner peripheral surface of the sleeve 121. The inner peripheral surface of the sleeve 121 provides a inner bearing surface 24 for radial load, and the cylindrical roller surface 221 provides a concavely spherical bottom bearing surface 25 for thrust load. A radial groove 41 extending from the central portion of the housing 21 and opening to the outer peripheral portion thereof is formed in the bottom of the housing 21, and an axially extending communication hole 33 which opens to the groove 41 is formed in the bottom bearing surface 25. Accordingly, the communication hole 33 opens to the outside of the housing 21, and the bottom bearing surface 25 is provided with an annular contact bearing surface 37.

In the illustrated embodiments, the dynamic pressure generating grooves 28 are provided in the outer bearing surface 27 for radial load, but such grooves 28 may also be provided in at least one of the inner bearing surface 24 and the outer bearing surface 27.

The bottom bearing surface 25 and the end bearing surface 31 for thrust load may be convex, planar or concave. However, if at least one of the bottom bearing surface 25 and the end bearing surface 31 is spherical, the starting torque of the bearing will be low and the abrasion of the bottom bearing surface 25 and the end bearing surface 31 will be small.

Further, the dynamic pressure type fluid bearing of the present invention may be of either the type in which the shaft 26 rotates or the type in which the housing 21 rotates, and may also be used where relative rotation is adopted.

The form of use of the dynamic pressure type fluid bearing may be either the vertical type or the horizontal type, or may be inverted.

The communication hole 33 may take one of various configurations.

Also, a filter may be inserted into the communication hole 33, whereby any abrasion powder which may be produced during the starting and the stoppage may be filtrated and prevented from discharging outwardly of the housing 21.

According to the dynamic pressure type fluid bearing of the present invention, the communication hole 33 provided in the bottom bearing surface 25 opens to the outside of the housing 21 and therefore, if the shaft 26 is axially displaced relative to the housing 21, the fluid in the pressure chamber 32 flows outwardly of the housing 21 through the communication hole 33 and the pressure of the fluid in the pressure chamber 32 is adjusted to a substantially constant level by the displacement of the shaft 26 relative to the housing 21, and the shaft 26 is out of contact with the housing 21, whereby a predetermined thrust load capability is obtained and the axial displacement of the shaft 26 relative to the housing 21 can be minimized. Also, the bottom bearing surface 25 has around the communication hole 33 the annular contact bearing surface 37 which contacts the end bearing surface 31 when the bearing is stationary and therefore, the contact surface pressure between the bottom bearing surface 25 and the end bearing surface 31 can be minimized when the bearing is stationary, thereby preventing the bottom bearing surface 25 and the end bearing surface 31 from being damaged. Further, the fact that the axially extending communication hole 33 which opens to the outside of the housing 21 can be provided in the bottom bearing surface 25 makes the machining of the communication hole 33 easy and the construction simple and inexpensive. Also, the communication hole 33 provided in the bottom bearing surface 25 opens to the outside of the housing 21 and therefore, any abrasion powder which may be produced during the starting and the stoppage may be discharged outwardly of the housing 21 so that the bearing surfaces such as the bottom bearing surface 25 and the end bearing surface 31 may not be damaged by the abrasion powder.

We claim:

1. A dynamic pressure type fluid bearing comprising:
   a housing provided with a cylindrical hole having a cylindrically shaped inner peripheral surface and a bottom surface;
   a shaft disposed in said cylindrical hole and having a cylindrically shaped outer peripheral surface opposed to and cooperative with said inner bearing surface to bear radial load and an end surface opposed to and cooperative with said bottom surface to bear thrust load;
   a pressure chamber formed between the bottom surface of the housing and the end surface of the shaft;
   means including a communication hole provided in said bottom bearing surface, the communication hole opening to the outside of said housing;
   means for generating a dynamic pressure and supplying the dynamic pressure to the pressure chamber, the dynamic pressure generating means being provided between said inner bearing surface of the housing and the outer bearing surface of the shaft; and
   means for communicating the communication hole to the pressure chamber when the dynamic pressure is supplied from the dynamic pressure generating means and discommunicating the communication hole from the pressure chamber when the bearing is stationary.

2. A dynamic pressure type fluid bearing according to claim 1, wherein said dynamic pressure generating means includes a spiral groove formed in the outer peripherl surface of the shaft.

3. A dynamic pressure type fluid bearing according to claim 2, wherein said communicating means includes a seat formed on the bottom surface of the housing around said communication hole.

4. A dynamic pressure type fluid bearing according to claim 3, wherein said seat includes an annular surface around said communication hole.

5. A dynamic pressure type fluid bearing according to claim 1, wherein said communicating means includes a seat formed on the bottom surface of the housing around said communication hole.

6. A dynamic pressure type fluid bearing according to claim 5, wherein said seat includes an annular surface around said communication hole.

* * * * *